(12) United States Patent
Kim et al.

(10) Patent No.: US 8,925,519 B2
(45) Date of Patent: Jan. 6, 2015

(54) DUAL FUEL COMMON RAIL SYSTEM AND FUEL INJECTOR

(75) Inventors: Hoisan Kim, Dunlap, IL (US); Mark F. Sommars, Hopewell, IL (US); Xiangdong Ding, Peoria, IL (US); Dana Coldren, Secor, IL (US)

(73) Assignee: Caterpillar Inc., Peoria, IL (US)

( * ) Notice: Subject to any disclaimer, the term of this patent is extended or adjusted under 35 U.S.C. 154(b) by 655 days.

(21) Appl. No.: 13/294,432

(22) Filed: Nov. 11, 2011

(65) Prior Publication Data

US 2013/0118448 A1    May 16, 2013

(51) Int. Cl.
| F02M 61/04 | (2006.01) |
| F02D 19/06 | (2006.01) |
| F02M 63/02 | (2006.01) |
| F02M 43/04 | (2006.01) |
| F02M 47/02 | (2006.01) |
| F02M 63/00 | (2006.01) |
| F02M 45/08 | (2006.01) |
| F02D 19/02 | (2006.01) |
| F02D 19/08 | (2006.01) |
| F02M 55/02 | (2006.01) |

(52) U.S. Cl.
CPC ......... *F02D 19/0647* (2013.01); *F02M 63/029* (2013.01); *F02M 43/04* (2013.01); *F02M 47/027* (2013.01); *F02M 63/0019* (2013.01); *F02M 63/0045* (2013.01); *F02M 63/0061* (2013.01); *F02M 45/086* (2013.01); *F02M 63/0064* (2013.01); *F02M 63/0033* (2013.01); *F02D 19/024* (2013.01); *F02D 19/0694* (2013.01); *F02D 19/081* (2013.01); *F02M 2200/44* (2013.01); *F02M 2200/46* (2013.01); *F02M 55/02* (2013.01); *Y02T 10/32* (2013.01)

USPC ......... 123/299; 123/456; 123/490; 239/585.1

(58) Field of Classification Search
USPC ......... 123/299, 305, 1 A, 575, 456, 478, 490; 239/585.1, 585.3, 533.9
See application file for complete search history.

(56) References Cited

U.S. PATENT DOCUMENTS

| 4,046,112 | A | * | 9/1977 | Deckard ........................ 239/96 |
| 5,529,024 | A | * | 6/1996 | Wirbeleit et al. ........... 123/25 C |
| 6,267,306 | B1 | | 7/2001 | Phillips et al. |
| 6,328,230 | B1 | | 12/2001 | Prillwitz et al. |
| 6,739,522 | B2 | | 5/2004 | Laumen |

(Continued)

FOREIGN PATENT DOCUMENTS

| DE | 4115478 | 5/1990 |
| JP | 10-184486 | 7/1998 |

(Continued)

*Primary Examiner* — Hieu T Vo
(74) *Attorney, Agent, or Firm* — Baker Hostetler

(57) ABSTRACT

A dual fuel system includes a plurality of fuel injectors that each have a non-injection configuration, a liquid fuel injection configuration, a gaseous fuel injection configuration and a combined fuel injection configuration. Each of the fuel injectors includes a liquid control valve member with a guide segment that defines a portion of a leak path from a liquid fuel inlet to a drain outlet, and a gas control valve member with a guide segment that defines a second leak path from the liquid fuel inlet to the drain outlet. Each injector body includes a tip component that defines both a liquid nozzle outlet set and a gas nozzle outlet set. A dual solenoid actuator has a first armature coupled to the liquid control valve member, a second armature coupled to the gas control valve member, and a shared stator.

20 Claims, 5 Drawing Sheets

(56) References Cited

U.S. PATENT DOCUMENTS

| | | |
|---|---|---|
| 6,856,222 B1 | 2/2005 | Forck |
| 7,124,959 B2 | 10/2006 | Baker et al. |
| 7,556,017 B2 | 7/2009 | Gibson |
| 7,891,579 B2 | 2/2011 | Mashida et al. |
| 2004/0250797 A1 | 12/2004 | Shetley |
| 2007/0199539 A1 | 8/2007 | Lennox et al. |
| 2011/0108631 A1 | 5/2011 | Mumford et al. |
| 2013/0047964 A1* | 2/2013 | Kim .............................. 123/478 |

FOREIGN PATENT DOCUMENTS

| | | |
|---|---|---|
| JP | 2009-57884 | 3/2009 |
| WO | 0246599 | 6/2002 |
| WO | 2007115594 | 10/2007 |

* cited by examiner

DUAL FUEL COMMON RAIL SYSTEM AND FUEL INJECTOR

TECHNICAL FIELD

The present disclosure relates generally to dual fuel engines, and more particularly to fuel injectors of a dual fuel common rail system for fueling an engine with gaseous and liquid fuels, respectively.

BACKGROUND

Gaseous fuel engines are known for their ability to burn clean relative to their compression ignition engine counterparts. However, gaseous fuels are well known for the difficulty in attaining successful ignition. Some gaseous fuel engines utilize a spark plug, whereas other engines are known for utilizing a small amount of distillate diesel fuel that is compression ignited to in turn ignite a larger charge of gaseous fuel. U.S. Pat. No. 7,373,931 teaches a dual fuel engine that utilizes a small quantity and compression ignited distillate diesel fuel to ignite a larger charge of gaseous fuel. This reference teaches the use of a fuel injector with nested needle valve members to facilitate injection of both the gaseous and liquid fuels from the same injector into each engine cylinder. However, the structure of the injector can lead to cross leakage between fuels, leakage of fuel into the engine cylinder and stacked tolerances that may lead to substantial performance variations when the fuel injectors are mass produced. In addition, the injector structure inherently requires different injection patterns depending upon whether the fuels are being injected individually or at the same time.

The present disclosure is directed toward one or more of the problems set forth above.

SUMMARY OF THE DISCLOSURE

A dual fuel injector includes an injector body that defines a first nozzle outlet set, a first fuel inlet, a second nozzle outlet set, a second fuel inlet and a drain outlet. The injector body has disposed therein a first nozzle chamber fluidly connected to the first fuel inlet, a second nozzle chamber fluidly connected to the second fuel inlet, a first control chamber fluidly connected to the first fuel inlet, and a second control chamber fluidly connected to the first fuel inlet. A first control valve member is guided in the injector body to move between a first position in contact with a first valve seat to close a first fluid connection between the first control chamber and the drain outlet, and a second position out of contact with the first valve seat to open the first fluid connection. The first control valve member includes a first guide segment separating a first high pressure area from a first low pressure area. A second control valve member is guided in the injector body to move between a first position in contact with a second valve seat to close a second fluid connection between the second control chamber and the drain outlet, and a second position out of contact with the second valve seat to open the second fluid connection. The second control valve member includes a second guide segment separating a second high pressure area from a second low pressure area. A first solenoid actuator with a first armature is operably coupled to the first control valve member, and a second solenoid actuator with a second armature is operably coupled to the second control valve member. The first control valve member, the second control valve member, the first armature and the second armature move along a common centerline.

In another aspect, a dual fuel system includes a plurality of fuel injectors that have a non-injection configuration, a liquid fuel injection configuration, a gaseous fuel injection configuration and a combined fuel injection configuration. Each of the fuel injectors has a liquid fuel inlet, a gaseous fuel inlet and a drain outlet. A gaseous fuel common rail is fluidly connected to the gaseous fuel inlet of each of the fuel injectors, and a liquid fuel common rail is fluidly connected to the liquid fuel inlet of each of the fuel injectors. Each of the fuel injectors includes a liquid control valve member with a guide segment guided in the injector body to move along a common centerline, and the guide segment defines a portion of a first leak path from the liquid fuel inlet to the drain outlet. Each of the fuel injectors includes a gas control valve member with a guide segment guided in the injector body to move along the common centerline, and the guide segment defines a portion of a second leak path from the liquid fuel inlet to the drain outlet. The injector body includes a tip component that defines a liquid nozzle outlet set and a gas nozzle outlet set. A dual solenoid actuator has a first armature operably coupled to the liquid control valve member along the common centerline, a second armature operably coupled to the gas control valve member along the common centerline, and a shared stator.

In still another aspect, a method of operating a dual fuel system includes injecting gaseous and liquid fuels through a gaseous nozzle outlet set and a liquid nozzle outlet set, respectively, of a fuel injector into an engine cylinder in an engine cycle. The liquid fuel is compression ignited. The injecting step includes moving a first armature, a second armature, a liquid control valve member and a gas control valve member along a common centerline. Liquid fuel is leaked from a liquid fuel inlet to a drain outlet of the fuel injector along a first leak path that is partially defined by a guide clearance between the liquid control valve member and the injector body. Liquid fuel is also leaked from the liquid fuel inlet to the drain outlet along a second leak path that is partially defined by guide clearance between the gas control valve member and the injector body.

DETAILED DESCRIPTION

Figure 1:
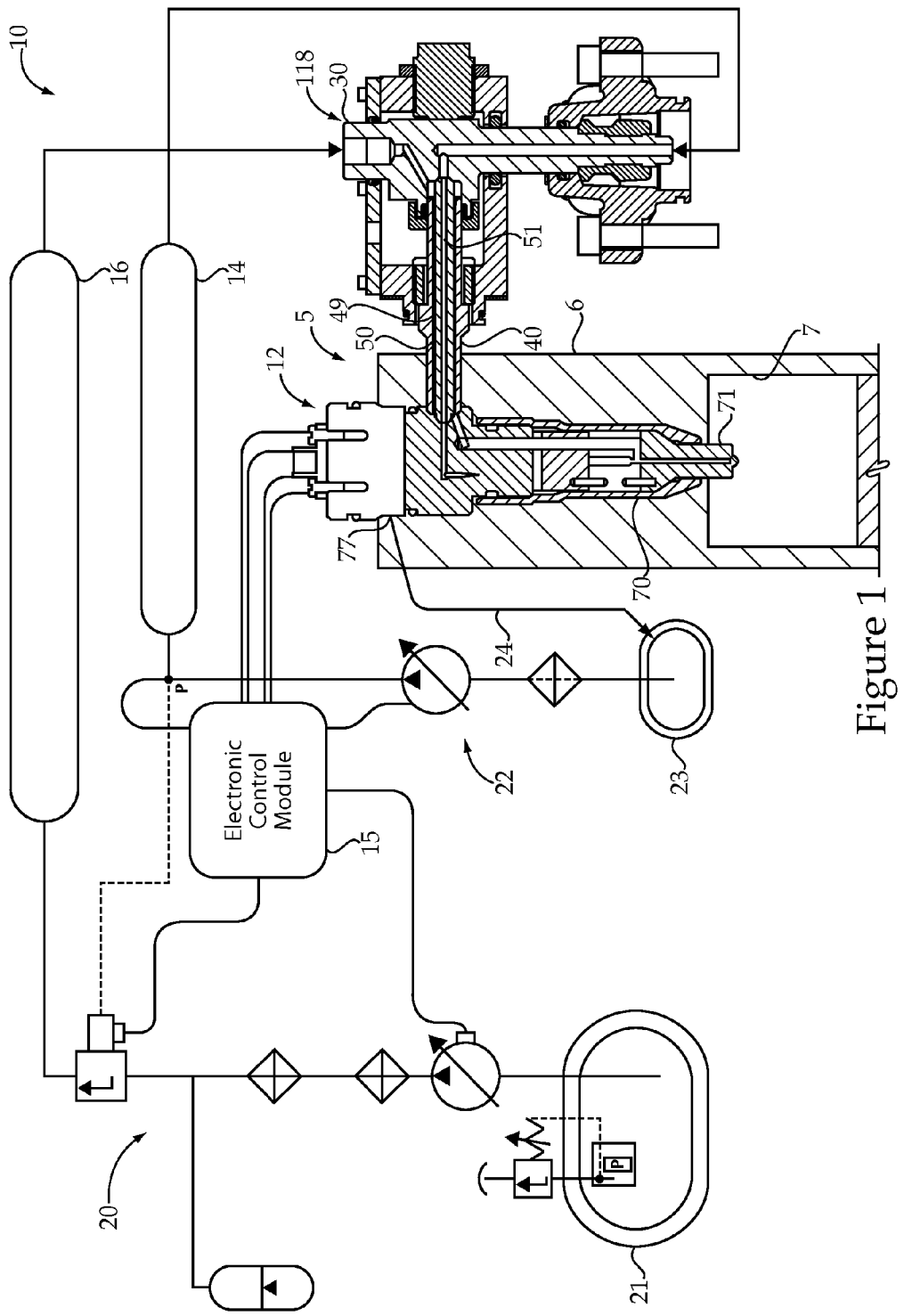
FIG. 1 is a schematic view of an engine and dual fuel common rail system according to the present disclosure.

Referring to FIG. 1, an engine 5 according to the present disclosure utilizes a dual fuel common rail system 10. Engine 5 includes an engine housing 6 that defines a plurality of cylinders 7, only one of which is shown. The dual fuel system 10 includes a plurality of fuel injectors 12 (only one shown) that each include an injector body 70 with a tip component 71 positioned for direct injection of gaseous fuel and/or liquid fuel into one of the engine cylinders 7 in each engine cycle. The dual fuel system 10 may include a plurality of outer tubes 50 and inner tubes 40 that each extend into engine housing 6 between a quill 30 and one of the fuel injectors 12. Each of the inner tubes 50 is compressed between a conical seat on an associated quill 30 and a conical seat on one of the fuel injectors 12. Thus, each engine cylinder 7 has one associated fuel injector 12, one outer tube 40, one inner tube 50 and one quill 30. The dual fuel system 10 includes a gaseous fuel common rail 16 that is fluidly connected to each of the fuel injectors 12 through one of the quills 30 and an outer passage 49 defined between an inner tube 50 and an outer tube 40. A liquid fuel common rail 14 is fluidly connected to each of the fuel injectors 12 through one of the quills 30 and an inner passage 51 defined by the inner tube 50.

An electronic controller 15 is in control communication with each of the fuel injectors 12 to selectively control the timing and quantity of both gaseous and liquid fuel injection events. Electronic controller 15 is also in control communication with a gas pressure control device 20 that is operably coupled to control the pressure in gaseous fuel common rail 16, and also in control communication with a liquid pressure control device 22 operably coupled to control the pressure in liquid fuel common rail 14. Although individual gases, such as methane, propane and the like are within the scope of the present disclosure, natural gas containing a mixture of gas species is particularly applicable to the present disclosure. In addition, the liquid fuel is chosen for the ability for compression ignition at the compression ratio of engine 5. For instance, the liquid fuel may be distillate diesel fuel or some other liquid fuel that is suitable for compression ignition to in turn ignite a charge of gaseous fuel in one of the engine cylinders 7.

In the illustrated embodiment, natural gas is maintained in a liquid state in a cryogenic liquefied natural gas tank 21. A variable displacement cryogenic pump is controlled by electronic controller 15 to pump liquefied natural gas through filters and a heat exchanger for expansion into a gas that is maintained in an accumulator. The gas pressure control device 20 according to the present disclosure may include an electronically controlled valve that supplies a controlled quantity of gaseous fuel from the supply side (accumulator) to the gaseous fuel common rail 16. This described supply strategy for natural gas is particularly suitable when engine 5 is mounted on a moving machine, such as a mining truck or the like. On the otherhand, if engine 5 were stationary, a gas pressure control device may be connected to a source of available natural gas and then regulated and/or compressed and fed to gaseous fuel common rail 16 in a manner that is controlled by electronic controller 15 to maintain a desired pressure in the rail 16.

The liquid fuel supply to liquid fuel common rail 14 begins at a tank 23. In the illustrated embodiment, the liquid fuel pressure control device 22 includes a high pressure common rail fuel pump of a type well known in the art whose output can be controlled by electronic controller 15 to maintain some desired pressure in liquid common rail 14. Another alternative might include fixed displacement pump and a rail pressure control valve that returns a quantity of the fuel back to tank 23 in order to control pressure in liquid fuel common rail 14. Any of these, and other known alternative strategies, fall within the contemplated scope of the present disclosure.

In the event that engine 5 is utilized in a moving machine, the present disclosure contemplates liquefied natural gas tank 21 having a larger capacity (maybe 65% greater volume) than the distillate diesel fuel tank 23 in order to account for the expected ratios of consumption from both tanks when operating in a standard dual fueling configuration in which maybe over 90% of the fuel delivery to engine 5 is in the form of natural gas and less than 10% in the form of distillate diesel fuel, by mass. This difference in sizing of tanks 21 and 23 also accounts for the densities of the respective liquids as well as the different heating values of the two fuels, as well as accounting for the fact that the natural gas is stored as a liquid but injected as a gas, whereas the distillate diesel fuel is stored and injected as a liquid into engine 5. When operating in a dual fueling mode corresponding to standard operation, electronic controller 15 includes a duel fuel control algorithm configured to maintain the gaseous fuel common rail at a medium low pressure and the liquid fuel common rail 14 at a medium high pressure, corresponding to a small pressure differential. If engine 5 is operating in a limp home single fueling mode, the electronic controller 15 may include a single fuel control algorithm configured to maintain the gaseous fuel common rail 16 at a low pressure and the liquid common rail 14 at a high pressure corresponding to a large pressure differential. For the sake of clarity, the identified high pressure is greater than the medium high pressure, which is greater than the medium low pressure, which is greater than the low pressure.

Figure 2:
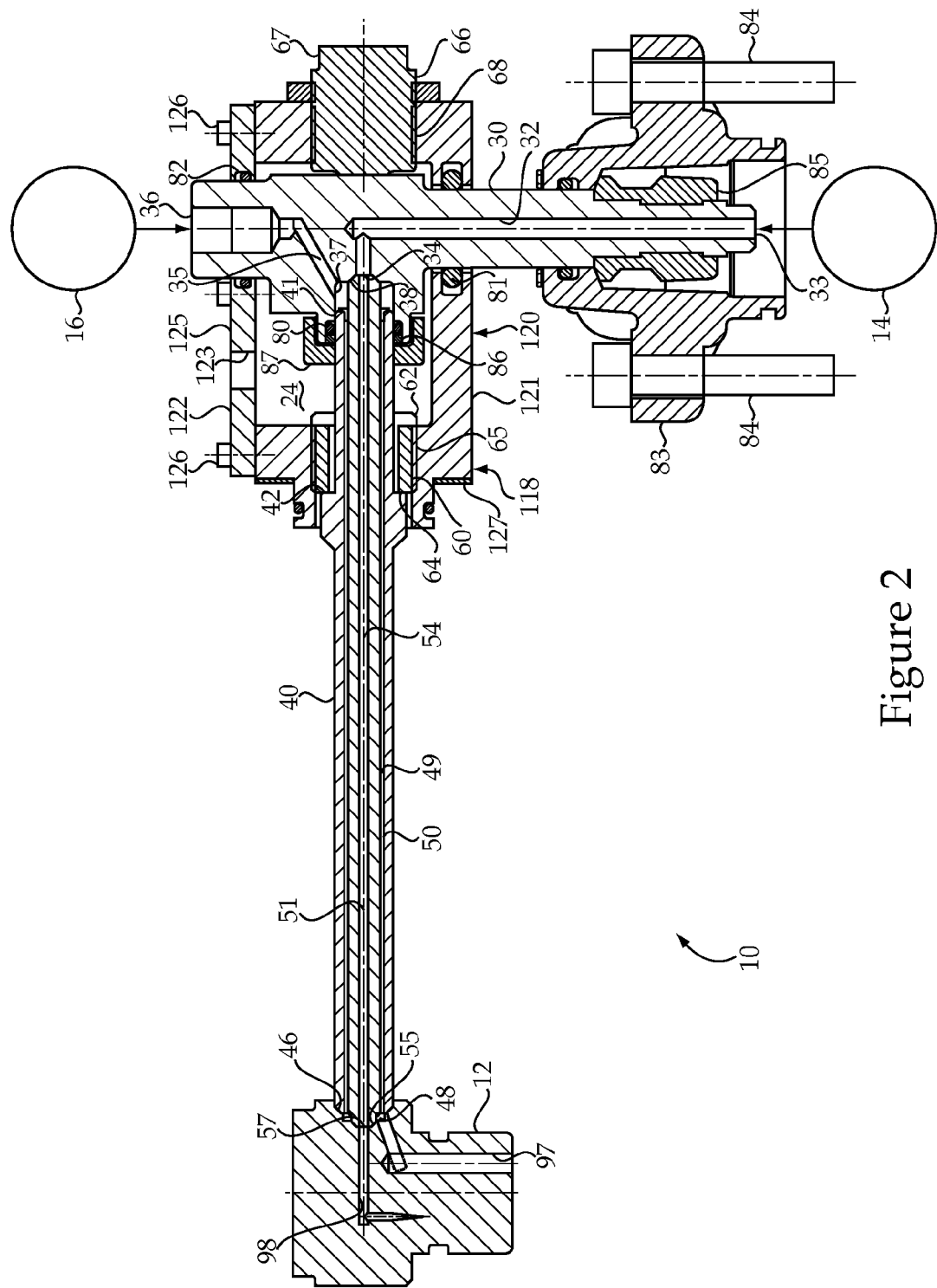
FIG. 2 is a side sectioned view of a portion of the dual fuel system of FIG. 1.

Referring to FIG. 2, the dual fuel common rail system 10 may include a coaxial quill assembly 118 fluidly connecting each fuel injector 12 with liquid and gas common rails 14, 16, respectively. Although the concepts of the present disclosure could apply to a variety of fuels for different types of engines, the illustrated embodiment is particularly suited for a gaseous fuel engine that utilizes distillate diesel fuel for compression ignition. In other words, an engine associated with dual fuel common rail system 10 might primarily burn liquefied natural gas supplied from second common rail 16, and ignite that charge in the engine combustion space by compression igniting a smaller charge of distillate diesel fuel from common rail 14 during a combustion event.

Coaxial quill assembly 118 includes a quill 30 at least partially positioned in a block 120. The quill includes a first fuel passage 32 extending between a first fuel inlet 33, which is fluidly connected to first common rail 14, and a first fuel outlet 34. Quill 30 also defines a second fuel passage 35 extending between a second fuel inlet 36, which is fluidly connected to second common rail 16, and a second fuel outlet 37. Quill 30 is fluidly connected to rails 14 and 16 using known hardware (e.g., fittings) and techniques. Fuel from first common rail 14 is moved through an engine housing 6 (engine head) via an inner passage 51 through inner tube 50, while fuel from second common rail 16 is moved to fuel injector 12 in an outer passage 49 defined between inner tube 50 and an outer tube 40. Inner tube 50 may be of a familiar construction to those skilled in the art, in that it includes rounded or conical ends that are compressed between a conical seat 38 of quill 30 and an inner conical seat 55 of fuel injector 12. Thus, the fluid passage 51 within inner tube 50 extends between first fuel outlet 34 of quill 30 and an inner fuel inlet 57 of fuel injector 12. Outer tube 40, which may have no contact with inner tube 50, has an inner diameter larger than an outer diameter of inner tube 50 in order to define an elongate outer passage 49 that opens on one end to second fuel outlet 37 of quill 30 and at its other end to an outer fuel inlet 48 of fuel injector 12. Outer tube 40 includes a rounded or conical end that is compressed into sealing contact with outer conical seat 46 of fuel injector 12. The outer fuel inlet 48 opens between the inner diameter of tube 40 and the outer surface of inner tube 50. Thus, fuel injector 12 defines an outer conical seat 46 that concentrically surrounds an inner conical seat 55. In addition, the fuel injector 12 includes an inner fuel inlet 57 surrounded by the inner conical seat 55 and the outer conical seat 46, and an outer fuel inlet 48 positioned between the inner conical seat 57 and the outer conical seat 46.

Outer tube 40 is compressed between quill 30 and the fuel injector 12. In particular, outer tube 40 includes a rounded or conical end in sealing contact with outer conical seat 46 and an opposite end received in a bore defined by quill 30. One end 41 outer tube 40 is sealed via an O-ring 80 that is positioned in a space 45 between outer tube 40 and quill 30. O-ring 80 is maintained in place against the pressure from second common rail 16 by a back up ring 86 held in place by a cap 87 threaded to quill 30. Outer tube 40 is compressed onto outer seat 46 of fuel injector 12 by an axial force applied to a load shoulder 42 by a compression load adjuster 60 that includes a contact surface 64 in contact with load shoulder 42. Compression load adjuster 60 includes outer threads 65 that mate with a set of inner threads defined by base 121 of block 120, and includes a tool engagement surface 62 located in hollow interior 124 of block 120 to facilitate adjusting a compression load on outer tube 40. Thus, leakage of the second fuel from common rail 16 to atmosphere is inhibited by setting a compression load on the outer tube 40 with compression load adjuster 60 above a predetermined threshold to facilitate a seal at outer conical seat 46, and by sealing the other end with o-ring 80.

Sealing at opposite ends of inner tube 50 is facilitated by a separate load adjuster 66 that includes threads 68 mated to internal threads defined by base 121 of block 120. Load adjuster 66 includes a tool engagement surface 67 located outside of block 20 that facilitates movement of compression load adjuster 66 along a common centerline 54. In other words, compression load adjuster 70 pushes along common centerline 54 against quill 30 to compress inner tube 50 between conical seat 38 of quill 30 and conical seat 55 of fuel injector 12. Because one end 41 of outer tube 40 can slide within quill 30, the respective compression loads on inner tube 50 and outer tube 40 can be adjusted independently to better insure proper sealing at all of the conical seats 38, 55 and 46. Thus, leakage of the first fuel originating from common rail 14 into the second fuel is inhibited by setting a compression load on the inner tube 50 above a predetermined threshold with compression load adjuster 66. In addition, leakage of the second fuel from common rail 16 into the first fuel from common rail 14 may include setting the pressure in common rail 14 higher than the pressure in common rail 16. Outer tube 40, inner tube 50, compression load adjuster 60, compression load adjuster 70, conical seat 38, inner conical seat 55 and outer conical seat 46 all share a common centerline 54. Other sealing strategies for one or both of inner tube 50 and outer tube 40 apart from that described in relation to the drawings also fall within the contemplated scope of the present disclosure.

As shown, quill 30 may be at least partially positioned within block 120, which includes a base 121 and a cover 122 that may be attached to base 121 by a plurality of fasteners 126. Base 121 may include a flange that facilitates attachment of block 120 to an engine head (housing 6) via bolts 128. As shown in the Figures, the first fuel inlet 33 and the second fuel inlet 36 of quill 30 may be located outside of block 120. A shim 127 may be included to adjust the distance between conical seat 38 and conical seat 57 to compensate for geometrical tolerances in the fuel system and engine components. Any of the second fuel that manages to leak past O-ring 80 into hollow interior 124 of block 120, may be vented to atmosphere via vent opening 123. Thus, vent opening 123 might be eliminated in a case where the fuel in common rail 16 is not gaseous at atmospheric pressure. Except for vent opening 123, hollow interior 24 may be substantially closed via an O-ring 81 that is in contact with quill 30 and block 120 and surrounds first fuel passage 32. In addition, a second O-ring 82 may be in contact with quill 30 and block 120 and surround the second fuel passage 35. Thus, vent opening 123 extends between hollow interior 125 and an outer surface 125 of block 120, which is exposed to atmosphere.

Coaxial quill assembly 118 may also include a flange 83, collar 85 and bolts 84 to facilitate a sealed fluid connection between quill 30 and common rail 14. Although co-axial quill assembly 118 is illustrated as including a separate block 120 and quill 30, those skilled in the art will appreciate that the functions and structures of those two components could be merged into a single component without departing from the present disclosure.

Figure 3:
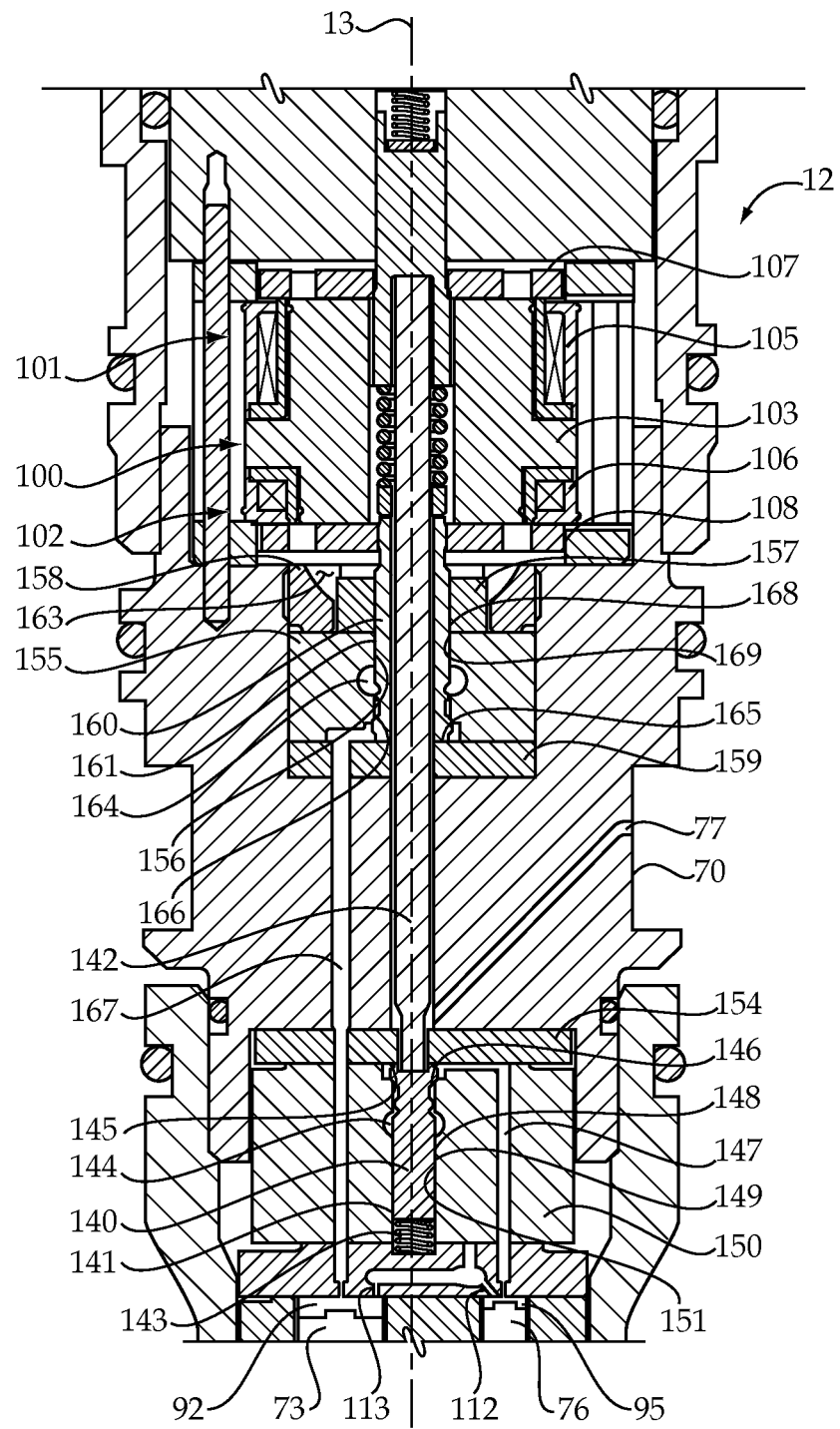
FIG. 3 is a sectioned side view of a top portion of one of the fuel injectors from FIG. 1.
Figure 4:
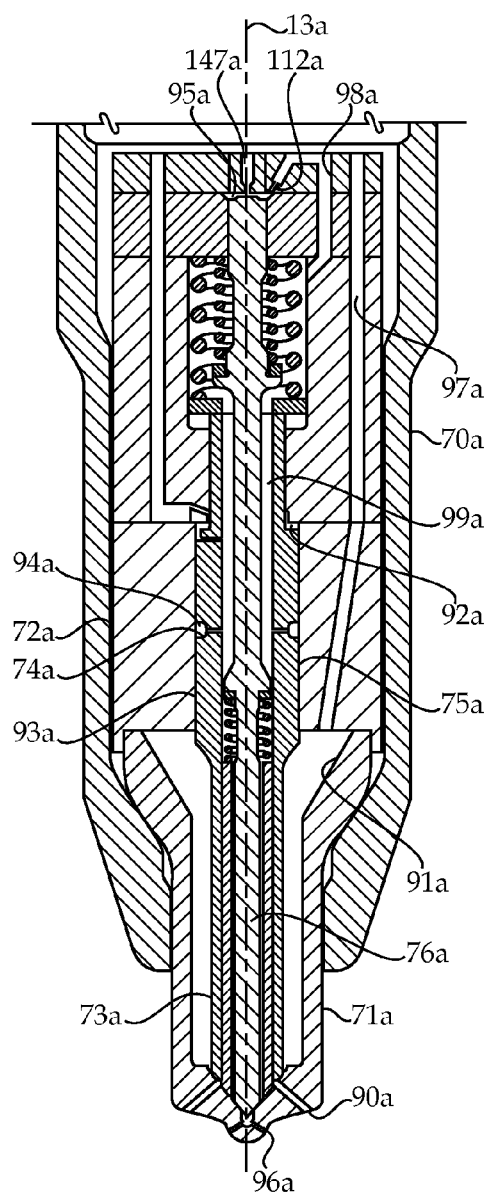
FIG. 4 is a sectioned side view of a bottom portion of a fuel injector according to one aspect of the present disclosure.
Figure 5:
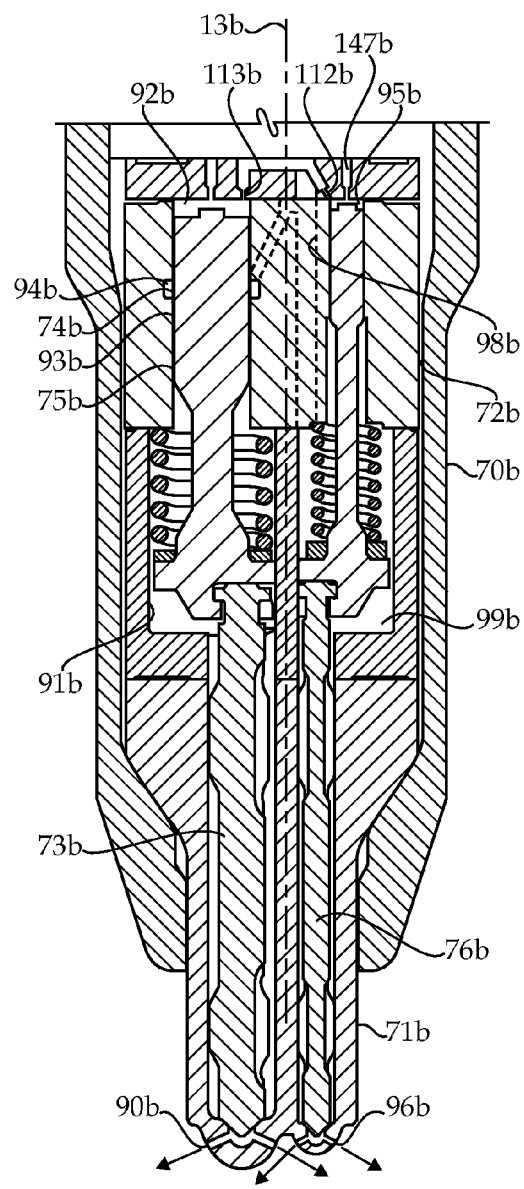
FIG. 5 is a sectioned side bottom portion view of a fuel injector according to another aspect of the present disclosure.

Referring now to FIGS. 3-5, each of the fuel injectors 12 includes two control valves that are individually actuated via respective electrical actuators in control communication with electronic controller 15. As such, each fuel injector 12 can be thought of as having a non-injection configuration, a liquid fuel injection configuration, a gaseous fuel injection configuration, and a combined fuel injection configuration. In the illustrated embodiment, the two control valves are each three way valves that open and close respective passageways to a low pressure drain outlet 77. As shown in FIG. 1, drain outlet 77 is fluidly connected to tank 23 via a drain return line 24. Thus, those skilled in the art will recognize that all of the control functions for fuel injector 12 are performed using the liquid fuel as a hydraulic medium in a manner well known in the art. FIGS. 4 and 5 show two different versions of a bottom portion of fuel injector 12. FIG. 4 showing a version in which the fuel injector has concentric gas nozzle outlet set 90a and liquid fuel nozzle outlet set 96a, whereas FIG. 5 shows a configuration in which the gas nozzle outlet set 90b is side by side with the liquid fuel nozzle outlet set 96b. Identical features in the two different fuel injector versions are identified with the same numerals, but the numerals include an "a" in the case of the dual concentric configuration of FIG. 4, and include a designation "b" in the case of the side by side version of FIG. 5. In both versions, the respective gas needle valve member 73 and liquid needle valve member 76 seat at different locations on the same tip component 71 of the injector body 70. Thus, in the embodiment of FIG. 4, the gas and liquid needle valve members 73a, 76a move along a common centerline 13a, whereas in the version of FIG. 5 the gas and liquid needle valve members 73b, 76b move parallel to, but offset from, the common centerline 13b.

Liquid fuel injection events are controlled by energizing and de-energizing a first solenoid actuator 101, which is in control communication with electronic controller 15. First solenoid actuator 101 includes a coil 105 and a first armature 107 that is operably coupled along common centerline 13 to liquid control valve member 140 by a pusher 142. Liquid control valve member 140 may be trapped to move between a first valve seat 145 and a second valve seat 146 depending upon the energization state of solenoid actuator 101. When solenoid actuator 101 is de-energized, liquid valve member 140 is biased upward into contact with valve seat 145 to close a fluid connection between liquid control chamber 95 and drain outlet 77. When in this position, liquid control valve member 140 is out of contact with valve seat 146 to open the fluid connection between liquid control chamber 95 and a high pressure area 144, which is fluidly connected to liquid fuel inlet 57 (FIG. 2) via passageways not visible in FIG. 3.

In the illustrated embodiment, valve seat 145 is a flat valve seat formed on the surface of plate 154 that is manufactured from a hardened material better suited to take the repeated impacts from liquid valve member 140. The lower valve seat 146 may be formed on a guide piece 150, which includes a guide bore that receives a guide segment 141 of liquid valve member 140, and may be in contact with plate 154 at its top surface. Guide segment 141 partially defines a guide clearance 149 that separates high pressure area 144 from a low pressure area 143. In other words, high pressure area 144 is fluidly connected to the liquid fuel inlet 57 (FIG. 2) via passages not shown, and low pressure area 143 is fluidly connected to drain outlet 77, also via passages not visible in the sectioned view of FIG. 3. The pressure gradient between high pressure area 144 and low pressure area 143 provide a leak path that fluidly connects liquid fuel inlet 57 to drain outlet 77. In the illustrated embodiment, the first valve seat 145 is shown as a flat valve seat, and the second valve seat 146 is shown as a conical valve seat, but those skilled in the art will appreciate that this combination could be reversed or both valve seats could be flat or conical, or any other permutation, without departing from the present disclosure.

When first solenoid actuator 101 is energized, armature 107 is drawn toward coil 105 causing pusher 142 to move downward to push liquid control valve member 140 from the position in contact with valve seat 145 downward to a position in contact with valve seat 146. When this occurs, a fluid connection between liquid control chamber 95 and drain outlet 77 is opened, causing pressure to drop in liquid control chamber 95, allowing liquid needle valve member 76 to move upward to an open position to commence a liquid injection event. Liquid injection events are ended by de-energizing first solenoid actuator 101 to allow a spring to push liquid control valve member 140 from contact with conical valve seat 146 upward into contact with flat valve seat 145 to close the fluid connection between liquid control chamber 95 and drain outlet 77, and open the fluid connection between liquid control chamber 95 and high pressure space 144. This causes pressure to rise in liquid control chamber 95 to help push liquid needle valve member 76 downward to close the liquid nozzle outlet set 96 to end the liquid injection event. Those skilled in the art will appreciate that although movement of liquid control valve member 140 can serve to change the pressure in liquid control chamber 95, the liquid nozzle chamber 99 is always at liquid rail pressure via its unobstructed fluid connection via liquid nozzle supply passage 98 to the liquid common rail 14.

Although not necessary, liquid control chamber 95 may also be always fluidly connected to liquid nozzle supply passage 98, and hence liquid common rail 14, via a Z orifice 112. Thus, when first solenoid actuator 101 is de-energized, liquid control chamber 95 may be fluidly connected to high pressure liquid fuel inlet 57 by way of high pressure area 144, past conical seat 146 and through pressure passage 147, and in parallel via liquid nozzle supply passage 98 and Z orifice 112. As stated earlier, one of these two passages, namely the one that includes pressure passage 147 is closed when solenoid actuator 101 is energized to move liquid control valve member 140 from contact with flat valve seat 145 down into contact with conical valve seat 146. When solenoid actuator 101 is again de-energized, an over travel feature might permit armature 107 and pusher 142 to continue moving upward after liquid control valve member 140 has come into contact with flat valve seat 145 in order to inhibit valve bounce and potentially undesirable secondary injections. A short time later, pusher 142 will come back into contact with liquid control valve member 140 returning fuel injector 12 to a reset configuration to prepare for a subsequent liquid fuel injection vent.

Gas injection events are controlled by energizing and de-energizing a second solenoid actuator 102 to move gas control valve member 160 between contact with a first valve seat 165 and a second valve seat 166. Second solenoid actuator includes a coil 106 that may be energized to move an armature 108 that may be attached to move with gas control valve member 160. Together, first solenoid actuator 101 and second solenoid actuator 102 may be considered a dual solenoid actuator 100 where each of the solenoid actuators 101, 102 includes separate coils 105, 106, but utilize a shared stator 103 in their construction. When second solenoid actuator 102 is de-energized, armature 108 and gas control valve member 160 may be biased downward to a position where gas control valve member 160 is in contact with first valve seat 165 to open a fluid connection between a high pressure area 164 and gas control chamber 92 via pressure passage 167. When in this position, high pressure prevails and gas control chamber 92, and gas control valve member 73 will be biased downward toward the position that closes gas nozzle outlet set 90.

When second solenoid actuator 102 is energized, armature 108 and gas control valve member 160 move out of contact with first valve seat 165 into contact with second valve seat 166 to open a fluid connection between gas control chamber 92 and drain outlet 77 via a large clearance between pusher 142 and injector body 70. This allows pressure in gas control chamber 92 to drop, allowing gas needle valve member 73 to lift upward to open gas nozzle outlet set 90 to commence a gas injection event. The gas injection event may be ended by de-energizing second solenoid actuator 102 so that gas control valve member 160 moves downward out of contact with second valve seat 166 back into contact with first valve seat 165 to close the fluid connection between gas control chamber 92 and drain outlet 77, and reopen the fluid connection between high pressure area 164 and gas control chamber 92, via pressure passage 167. Although not necessary, first valve seat 165 may be a flat valve seat formed on a plate 159 that is made of a suitable material to withstand the repeated impacts from gas control valve member 160. The second valve seat 166 may be a conical valve seat formed on a guide piece 155, that is a portion of injector body 170. Thus, gas control valve member 160 can be thought of as being trapped to move between flat valve seat 165 and conical valve seat 166. However, those skilled in the art will appreciate that the shape of the valve seats could be reversed or both valve seats could be either flat or conical, or some other permutation, without departing from the present disclosure.

Guide piece 155 and a guide piece 157 define a guide bore 156 that receives a guide segment 161 of gas control valve member 160. Guide segment 161 partially defines a guide clearance 169 separating high pressure area 164 from a low pressure area 163. Thus, a pressure gradseat exists in guide clearance 169. High pressure area 164 may be fluidly connected to liquid fuel inlet 57 (FIG. 2) via passages not shown in the sectioned view of FIG. 3. Low pressure area 163 may be fluidly connected to drain outlet 77, also via passages not visible in the sectioned view of FIG. 3. Thus, the guide clearance 169 provides a second leak path between liquid fuel inlet 57 and drain outlet 77.

Although not necessary, gas control chamber 92 may also always be fluidly connected to liquid fuel inlet 57 via a Z orifice 113 that is fluidly connected to liquid nozzle supply passage 98 via passages not visible in the sectioned views of FIGS. 3-5. Thus, when second solenoid actuator 102 is de-energized, gas control chamber 92 may be fluidly connected to liquid fuel inlet 57 through two passages in parallel, with the first passage including Z orifice 113, and a second passage including pressure passage 167 and high pressure area 164.

One of these two passages is closed when second solenoid actuator 102 is energized to move liquid control valve member 160 to a position in contact with conical valve seat 166 to close the fluid connection with high pressure area 164. Gaseous nozzle chamber 91 (FIGS. 4 and 5) is always fluidly connected to gaseous nozzle supply passage 97 and hence gaseous fuel inlet 48 (FIG. 2) via passageways not visible in the sectioned views of FIGS. 3-5.

Both solenoid actuators 101 and 102 will be de-energized when fuel injector 12 is in a non-injection configuration. When in a liquid fuel injection configuration, first solenoid actuator 101 will be energized but second solenoid actuator 102 will remain de-energized. During a gaseous fuel injection event, first solenoid actuator 101 remains de-energized while second solenoid actuator 102 becomes energized. During a combined injection event, both solenoid actuators 101 and 102 will be energized. Each of these configurations include the positioning of armatures 107 and 108, the positioning of control valve members 140 and 160 as well, as the positioning of needle valve members 76 and 73 as described previously. In the present construction, liquid control valve member 140, gas control valve member 160, first armature 107 and second armature 108 all move along a common centerline 13 to facilitate liquid and gaseous fuel injection events.

In order to better facilitate ease of manufacture and assembly, guide piece 150 and plate 154 may be portions of the injector stack that makes up a portion of injector body 70 such that these components are compressed together in a known manner when injector body 70 is assembled. On the otherhand, plate 159, guide piece 155 and guide piece 157 may also be considered a portion of injector body 70 but may be received in a chamber and pressed together with a nut 158 as best shown in FIG. 3. Although these structures are not necessary, they may assist in manufacturability and assembly. In addition, although not necessary, the pressure passages 147 and 167 may have a majority of their length extending parallel to common centerline 13, again to potentially reduce costs regarding manufacturing, as opposed to passageways that slant at odd angles through injector body 70. Pressure passage 147 extends between liquid control chamber 95 and liquid control valve member 140 and may have any suitable orientation or length without departing from the present disclosure. In addition, pressure passage 167, which extends between gas control chamber 92 and gas control valve member 160 may also have any suitable length and orientation without departing from the present disclosure.

In both versions of fuel injector 12, gas needle valve member 73 is positioned completely inside of injector body 70 with a guide surface 75 extending in a guide component 72 of injector body 70 between the gas control chamber 92 and the gas nozzle chamber 91. The gas nozzle chamber 91 is always fluidly connected to the gaseous fuel common rail 16, and is therefore at about the same pressure as the gaseous fuel common rail 16. A guide segment 74 of gas needle valve member 73 and the guide component 72 define a portion of an annular volume 94 that is always fluidly connected to liquid common rail 14 via a branch passage that is fluidly connected to liquid nozzle supply passage 98. This structure may help to maintain lubricity in the guide clearance 93 due to the liquid common rail 14 generally being at a higher pressure than gaseous common rail 16.

INDUSTRIAL APPLICABILITY

The dual fuel common rail system 10 of the present disclosure finds general applicability to any engine that utilizes two fuels in the combustion space of an associated engine. These two fuels may be the same fuel at two different pressures or two different tip geometries or both, or may, as in the illustrated embodiment be different fuels. Although the present disclosure could apply to spark ignited engines utilizing appropriate fuels, the present disclosure finds particular applicability in gaseous fuel engines that utilize a relatively large charge of natural gas that is ignited via compression ignition of a small charge of distillate diesel fuel originating from common rail 14. The coaxial quill assembly 118 of the present disclosure can facilitate movement of both fuels to a fuel injector 12 mounted in the head 6 of an engine 5 via a single bore through the engine head associated with each fuel injector 12 of the engine 5. This strategy conserves valuable space in and around the engine and may also facilitate retrofit applications.

By utilizing a block 120 that is bolted to the outer surface of the engine head, separate load adjusters 60 and 66 can be utilized to independently load the inner tube 50 and outer tube 40 onto the conical seats 57 and 46, respectively of fuel injector 12 to inhibit fuel leakage between the fuels and to inhibit fuel leakage to atmosphere outside of fuel injector 12, while accounting for slight dimensional differences associated with each fuel injector fluid connection.

When in operation, the first fuel (distillate diesel) at a first pressure moves from first common rail 14 through the first fuel passage 32, through inner tube 50 and into fuel injector 12. The gaseous fuel at a second pressure is moved from the gaseous common rail 16 through the second fuel passage 35, through the outer passage 49 between outer tube 40 and inner tube 50 and into fuel injector 12. Leakage of the gaseous fuel to the liquid fuel may be inhibited by setting the pressure in liquid common rail 14 to a medium high pressure (maybe about 40 MPa) higher than the pressure in gaseous common rail 16 to medium low pressure (maybe about 35 MPa). Leakage of the liquid fuel into the gaseous fuel includes setting a compression load on the inner tube 50 above a first predetermined threshold with the compression load adjuster 66 to create appropriate sealing forces on both ends of tube 50. Leakage of the second fuel to atmosphere may be inhibited by setting a compression load on the outer tube 40 above a second predetermined threshold with the second load adjuster 60 to create a seal between outer tube 40 and fuel injector 12. Leakage of gaseous fuel to atmosphere may be inhibited by including at least one o-ring, such as o-ring 80 in contact with outer tube 40. Nevertheless, those skilled in the art will appreciate that other concentric tube supply arrangements could be utilized without departing from the present disclosure. However, in the illustrated embodiment, leakage and variations in geometrical tolerances in the various components of engine 5 and fuel system 10 can be accommodated by utilizing first and second compression load adjusters 60 and 66 to respectively adjust the compression loads in the outer tube 40 and the inner tube 50 individually.

The fuel system 10 according to the present disclosure also includes several subtle functions providing advantages over known dual fuel systems. Among these are independent injection control via separate valves and separate electrical actuators for each of the gas and liquid systems. Thus, the fuel injector 12 can be controlled to inject gaseous fuel only, liquid fuel only, both gaseous and liquid fuel simultaneously, and of course having non-injection mode when no injection occurs. Although the migration of gaseous fuel into the liquid fuel is generally inhibited by maintaining the liquid fuel common rail 14 at a higher pressure than the gaseous fuel common rail 16, other subtle but important features assist in preventing such leakage. Cross leakage issues are also inhibited by locating the liquid fuel supply in the inner tube 50, and locating the gaseous fuel supply to injectors 12 in the outer passage 49 between inner tube 50 and outer tube 40. By locating these passageways concentrically, each fuel injector 12 can be supplied with both fuels via one passageway through the engine housing 6 (head) rather than two passageways. Lubricity of the moving components within the fuel injector 12 may be maintained by exposure to liquid diesel fuel. For instance, the guide clearance 93 associated with gas needle valve member 73 may be maintained with liquid diesel fuel to maintain lubricity, even though one end of the gas needle 73 is always exposed to gaseous fuel in gas nozzle chamber 91.

By utilizing the concentric supply strategy, the fuel system 10 of the present disclosure presents a potential opportunity for retrofitting existing engines with minimized engine cylinder head modifications. The structure of both versions of fuel injectors 12 also inhibits the leakage of gaseous fuel into the engine cylinder by locating both the gaseous fuel nozzle outlets 90 and the liquid fuel nozzle outlets 96 in a single tip component 71, rather than via some nested needle strategy of a type known in the art. Thus, the fuel injector 12 of the present disclosure may avoid stacked tolerances and other uncertainties by making each of the gas and liquid needle structures completely independent in their movement, seating and biasing features. This strategy may better enable mass production of fuel injectors that perform consistently with the same control signals. Finally the engine 5 of the present disclosure contemplates both a normal dual fueling mode and a limp home mode in which only liquid fuel is injected. For instance, if a malfunction occurs in the gaseous fuel system or if the gaseous fuel supply is exhausted, the electronic controller 15 may cause or allow the engine to switch from a dual fueling mode (dual fuel control algorithm) to the limp home mode (single fuel control algorithm).

Figure 6:
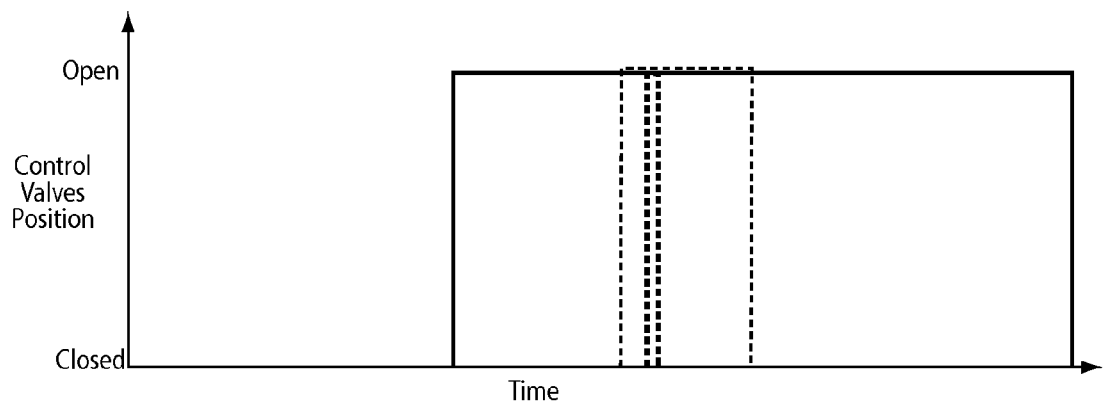
FIG. 6 is a series of graphs showing control valve positions, gaseous and liquid fuel rail pressures and injection rates verses time for the dual fuel system of FIG. 1 when operating in a dual fueling mode and a limp home mode.
Figure 6:
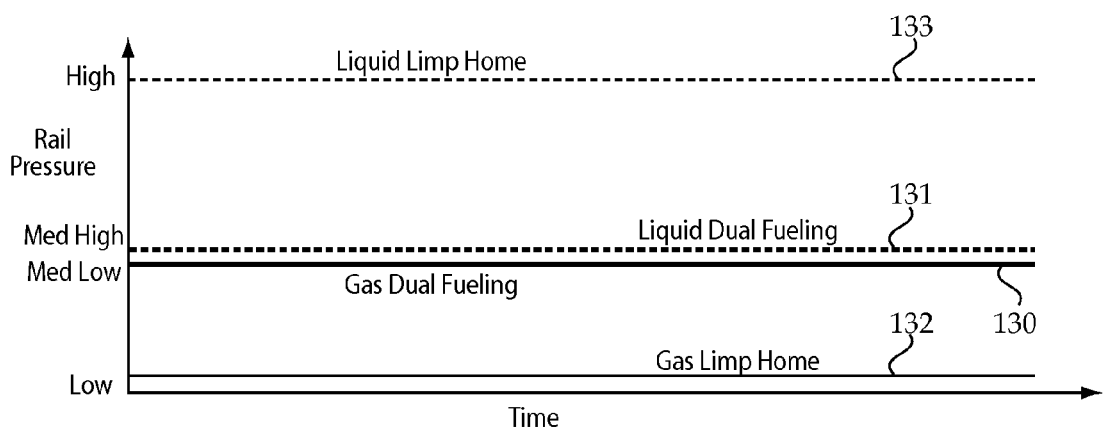
Figure 6:
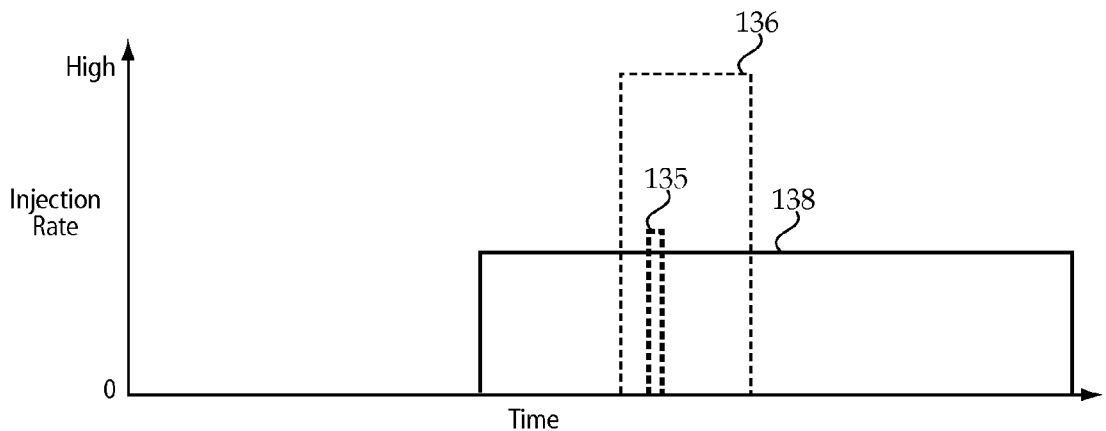

As best shown in FIG. 6, the dual fueling mode may be characterized by a large gas injection quantity 138 and a small quantity injection 135 of liquid fuel. On the otherhand, the limp home mode may be characterized by no gas injection but a large quantity 136 liquid fuel injection. In addition, the normal dual fueling mode is characterized by the gas and liquid common rails 16 and 14 being maintained at medium low and medium high pressures, respectively. On the otherhand, the limp home mode may be characterized by the gaseous fuel common rail being allowed to decay to, or be maintained at, a low pressure, while pressure in the liquid common rail 14 is increased to a high pressure 133 (maybe greater than 100 MPa). When operating in the dual fueling mode, a relatively small injection of liquid distillate diesel fuel is compression ignited to in turn ignite a relatively large charge of gaseous fuel at least partially previously injected into the engine cylinder. On the otherhand, during a limp home mode, engine 5 functions as a somewhat conventional diesel engine in which a relatively large quantity of liquid fuel is injected at or around top dead center of the compression stroke to instantaneously ignite upon injection in a known manner.

Some variations of the disclosed fuel system 10 that would still fall within the intended scope of the present disclosure could include the elimination of one or both of the Z orifices 112 and 113. Or, Z orifices 112 and/or 113 could be retained, but the high pressure conical seat 146 and/or 166 could be eliminated. Thus, two way control valves would also fall within the intended scope of the disclosure. Although these alternatives and their various permutations, may fall within the scope of the present disclosure, the disclosed strategy that utilizes three way control valves and two parallel passages between the respective control chambers 95 and 92 and the liquid fuel inlet 57 may permit more abrupt endings to injection events, and may permit pressures to rise and components to settle to their pre-injection configurations after an injection event to shorten dwell times between injection events. In another alternative version, one or both plates 154 and 159 could be eliminated and the respective valve seats 145 and 165 formed on another injector body component. However, by utilizing separate plates, a material can be chosen and a surface finish provided more easily that withstands the repeated impacts from the respective control valve members 140 and 160 without deteriorating the effectiveness of the valving operation. Still another alternative might be to adjust the design so that control valve member 140 and 160 are identical components, and merely are mounted in inverse orientations in the respective fuel injectors 12. For instance, if both control valve members 140 and 160 were hollow as in control valve member 160, some costs savings might be realized by utilizing identical components for both features of the fuel injector 12. Still another alternative embodiment that would fall within the intended scope of the present disclosure would be to attach pusher 142 to control valve member 140 or form both from a single piece. Such an alternative might eliminate one component and potentially eliminate an over travel feature and may make setting the initial and final air gaps of the first solenoid actuator 101 more difficult, but such an alternative would still fall within the scope of the present disclosure. Still another alternative would be to have completely separate solenoid actuators 101 and 102 rather than as shown utilizing a dual solenoid actuator 100 that is formed around a shared stator 103. By organizing all of the control valve and solenoid actuator features to move along a common centerline 13, undesirable off center mechanisms, such as levers, might be eliminated without sacrificing performance. Those skilled in the art will appreciate that the amount of undesirable leakage along the guide clearances 149 and 169 can be somewhat controlled by choosing a guide clearance length and diametrical clearance that facilitate good operation while minimizing leakage. However, by having a design that permits some fuel leakage from the high pressure liquid fuel inlet 57 to the drain outlet 77, other subtle advantages are gained in regard to manufacturability and ease of assembly, and hence potential cost reductions, that may outweigh any leakage penalty that may exist. By utilizing each control valve member 140 and 160 as being trapped to move between a flat valve seat 145, 165 and a conical valve seat 146, 166, those skilled in the art will appreciate that some misalignment between two valve seats can be tolerated with little to no undermining of performance. For instance, if the valve members were trapped to move between two conical seats, additional guide features might be necessary along with the associated stack up of tolerances, etc.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:
1. A dual fuel injector comprising:
an injector body defining a first nozzle outlet set, a first fuel inlet, a second nozzle outlet set, a second fuel inlet, and a drain outlet and having disposed therein a first nozzle chamber fluidly connected to the first fuel inlet, a second nozzle chamber fluidly connected to the second fuel inlet, a first control chamber fluidly connected to the first fuel inlet, and a second control chamber fluidly connected to the first fuel inlet;
a first control valve member guided in the injector body to move between a first position in contact with a first valve seat to close a first fluid connection between the first control chamber and the drain outlet, and a second position out of contact with the first valve seat to open the first fluid connection, and including a first guide segment separating a first high pressure area from a first low pressure area;
a second control valve member guided in the injector body to move between a first position in contact with a second valve seat to close a second fluid connection between the second control chamber and the drain outlet, and a second position out of contact with the second valve seat to open the second fluid connection, and including a second guide segment separating a second high pressure area from a second low pressure area;
a first solenoid actuator with a first armature operably coupled to the first control valve member;
a second solenoid actuator with a second armature operably coupled to the second control valve member; and
the first control valve member, the second control valve member, the first armature and the second armature move along a common centerline.

2. The dual fuel injector of claim 1 wherein the first solenoid actuator and the second solenoid actuator have separate coils but share a shared stator.

3. The dual fuel injector of claim 1 wherein the first fuel inlet is surrounded by an inner conical seat and an outer conical seat;
the second fuel inlet opens between the outer conical seat and the inner conical seat; and
the first nozzle outlet set and the second nozzle outlet set are defined by a tip component of the injector body.

4. The dual fuel injector of claim 1 wherein each of the first and second control chambers is fluidly connected to the first fuel inlet through two passages in parallel when the first and second control valve members are in their respective first positions.

5. The dual fuel injector of claim 1 including a first pressure passage extending between the first control chamber and the first control valve member;
a second pressure passage extending between the second control chamber and the second control valve member; and
a majority of the lengths of the first pressure passage and the second pressure passage being oriented parallel to the common centerline.

6. The dual fuel injector of claim 1 wherein the first control valve member is trapped to move between a first flat valve seat and a first conical valve seat; and
the second control valve member is trapped to move between a second flat valve seat and a second conical valve seat.

7. The dual fuel injector of claim 6 wherein the injector body includes a first guide piece that includes the first conical valve seat and defines a first guide bore that receives the first guide segment;
the injector body includes a second guide piece that includes the second conical seat, and defines a second guide bore that receives the second guide segment;
the injector body includes a first plate that is in contact with the first guide piece and includes the first flat valve seat; and the injector body includes a second plate that is in contact with the second guide piece and includes the second flat valve seat.

8. The dual fuel injector of claim 7 wherein the first solenoid actuator and the second solenoid actuator have separate coils but share a shared stator;
the first fuel inlet is surrounded by an inner conical seat and an outer conical seat;
the second fuel inlet opens between the first common rail conical seat and the second common rail conical seat;
the first nozzle outlet set and the second nozzle outlet set are defined by a tip component of the injector body;
each of the first and second control chambers is fluidly connected to the first fuel inlet through two passages in parallel when the first and second control valve members are in their respective first positions;
a first pressure passage extending between the first control chamber and the first control valve member;
a second pressure passage extending between the second control chamber and the second control valve member; and
a majority of the lengths of the first pressure passage and the second pressure passage being oriented parallel to the common centerline.

9. The dual fuel injector of claim 8 wherein each of the first and second needle valve members move parallel to, but offset from, the common centerline.

10. The dual fuel injector of claim 8 wherein each of the first and second needle valve members move along the common centerline.

11. A dual fuel system comprising:
a plurality of fuel injectors that have a non-injection configuration, a liquid fuel injection configuration, a gaseous fuel injection configuration and a combined fuel injection configuration, and each of the fuel injectors having a liquid fuel inlet, a gaseous fuel inlet and a drain outlet;
a gaseous fuel common rail fluidly connected to the gaseous fuel inlet of each of the fuel injectors;
a liquid fuel common rail fluidly connected to the liquid fuel inlet of each of the fuel injectors;
each of the fuel injectors includes a liquid control valve member, with a guide segment, guided in an injector body to move along a common centerline, and the guide segment defines a portion of a first leak path from the liquid fuel inlet to the drain outlet;
each of the fuel injectors includes a gas control valve member, with a guide segment, guided in an injector body to move along the common centerline, and the guide segment defines a portion of a second leak path from the liquid fuel inlet to the drain outlet;
the injector body including a tip component that defines a liquid nozzle outlet set and a gas nozzle outlet set; and
a dual solenoid actuator with a first armature operably coupled to the liquid control valve member along the common centerline, a second armature operably coupled to the gas control valve member along the common centerline, and a shared stator.

12. The dual fuel system of claim 11 wherein each of the liquid control valve member and the gas control valve member are trapped to move between a flat valve seat and a conical valve seat.

13. The dual fuel system of claim 11 wherein the gaseous fuel common rail and the liquid fuel common rail are fluidly connected to each of the fuel injectors through outer and inner passages, respectively, defined by a pair of concentric tubes.

14. The dual fuel system of claim 11 wherein a gas control chamber of each of the fuel injectors is fluidly connected to the liquid fuel inlet by two passages in parallel when the gas control valve member is in a first position; and a liquid control chamber of each of the fuel injectors is fluidly connected to the liquid fuel inlet by two passages in parallel when the liquid control valve member is in a first position.

15. The dual fuel system of claim 14 wherein each of the fuel injectors includes a first pressure passage extending between the liquid control chamber and the liquid control valve member;

a second pressure passage extending between the gas control chamber and the gas control valve member; and a majority of the lengths of the first pressure passage and the second pressure passage being oriented parallel to the common centerline.

16. The dual fuel system of claim 11 including an electronic controller in control communication with a gas pressure control device, a liquid pressure control device and each of the fuel injectors, and including a dual fuel control algorithm configured to maintain a small pressure differential between the liquid fuel common rail and the gaseous fuel common rail, and a single fuel control algorithm configured to maintain a large pressure differential between the liquid fuel common rail and the gaseous fuel common rail.

17. The dual fuel system of claim 11 wherein the injector body includes a first guide piece that includes a first conical valve seat and defines a first guide bore that receives the guide segment of the liquid control valve member;

the injector body includes a second guide piece that includes the second conical seat, and defines a second guide bore that receives the guide segment of the gas control valve member;

the injector body includes a first plate that is in contact with the first guide piece and includes a first flat valve seat; and the injector body includes a second plate that is in contact with the second guide piece and includes a second flat valve seat.

18. A method of operating a dual fuel system comprising the steps of:

injecting gaseous and liquid fuels through a gaseous nozzle outlet set and liquid nozzle outlet set, respectively, of a fuel injector into an engine cylinder in an engine cycle;

compression igniting the liquid fuel;

wherein the step of injecting includes moving a first armature, a second armature, a liquid control valve member, and a gas control valve member along a common centerline;

leaking liquid fuel from a liquid fuel inlet to a drain outlet of the fuel injector along a first leak path that is partially defined by a guide clearance between the liquid control valve member and the injector body; and leaking liquid fuel from the liquid fuel inlet to the drain outlet of the fuel injector along a second leak path that is partially defined by a guide clearance between the gas control valve member and the injector body.

19. The method of claim 18 wherein the step of moving a liquid control valve member includes closing one of two passages fluidly connecting a liquid needle control chamber to a liquid common rail and opening a fluid connection from the liquid needle control chamber to the drain outlet; and wherein the step of moving a gaseous control valve member includes closing one of two passages fluidly connecting a gaseous needle control chamber to the liquid common rail and opening a fluid connection from the liquid needle control chamber to the drain outlet.

20. The method of claim 19 wherein the injecting steps include moving a gaseous needle valve member and a liquid needle valve member parallel to, but offset from, the common centerline.

* * * * *